(12) United States Patent  
Cheng et al.

(10) Patent No.: US 8,427,091 B2  
(45) Date of Patent: Apr. 23, 2013

(54) DRIVE WITH HEAT DISSIPATION AND ENERGY-SAVING FUNCTION

(75) Inventors: Chi-Yuan Cheng, Taichung (TW); Ming Fu Tsai, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 300 days.

(21) Appl. No.: 13/044,495

(22) Filed: Mar. 9, 2011

(65) Prior Publication Data  
US 2012/0229059 A1    Sep. 13, 2012

(51) Int. Cl.  
*H02P 29/00* (2006.01)

(52) U.S. Cl.  
USPC ............ 318/400.3; 318/400.26; 318/376; 318/801; 257/714; 361/697

(58) Field of Classification Search ......... 318/400.26, 318/400.3, 376, 801; 257/714; 361/697; 388/805  
See application file for complete search history.

(56) References Cited

U.S. PATENT DOCUMENTS

| | | | | |
|---|---|---|---|---|
| 5,610,493 A * | 3/1997 | Wieloch | | 318/801 |
| 5,623,191 A * | 4/1997 | Wieloch | | 318/801 |
| 5,699,609 A * | 12/1997 | Wieloch | | 29/830 |
| 5,774,353 A * | 6/1998 | Wieloch | | 363/146 |
| 6,194,856 B1 * | 2/2001 | Kobayashi et al. | | 318/432 |
| 6,784,643 B2 * | 8/2004 | Hayashi et al. | | 322/24 |
| 6,817,191 B2 * | 11/2004 | Watanabe | | 62/3.7 |
| 7,538,426 B2 * | 5/2009 | Yamabuchi et al. | | 257/714 |
| 7,616,442 B1 * | 11/2009 | Kaveh | | 361/697 |
| 8,228,700 B2 * | 7/2012 | Yahata et al. | | 363/144 |
| 8,283,880 B2 * | 10/2012 | Iwashita et al. | | 318/376 |
| 2002/0145343 A1 * | 10/2002 | Hayashi et al. | | 310/68 R |
| 2003/0076233 A1 * | 4/2003 | Sato et al. | | 340/679 |
| 2003/0133492 A1 * | 7/2003 | Watanabe | | 374/179 |
| 2004/0221217 A1 * | 11/2004 | Sato et al. | | 714/745 |
| 2006/0113661 A1 * | 6/2006 | Yamabuchi et al. | | 257/706 |
| 2008/0290506 A1 * | 11/2008 | Aoki et al. | | 257/714 |
| 2008/0291628 A1 * | 11/2008 | Aoki et al. | | 361/699 |
| 2009/0268405 A1 * | 10/2009 | Kaveh | | 361/697 |
| 2011/0031916 A1 * | 2/2011 | Bonner et al. | | 318/400.26 |
| 2011/0033173 A1 * | 2/2011 | Bonner et al. | | 388/805 |
| 2011/0260662 A1 * | 10/2011 | Yoshida et al. | | 318/400.3 |
| 2011/0273118 A1 * | 11/2011 | Bonner et al. | | 318/400.3 |
| 2011/0298402 A1 * | 12/2011 | Iwashita et al. | | 318/376 |

* cited by examiner

*Primary Examiner* — Paul Ip  
(74) *Attorney, Agent, or Firm* — Guice Patents PLLC

(57) ABSTRACT

A drive with heat dissipation and energy-saving function for supplying power to drive a motor. The drive includes a driving circuit having a rectification section. The rectification section serves to receive AC current generated when the motor abruptly accelerates/decelerates and convert the AC current into DC current and output the DC current. The drive further includes a cooling module electrically connected to an output end of the rectification section. The cooling module is drivable by the DC current output from the rectification section to conduct out and dissipate heat.

5 Claims, 2 Drawing Sheets

US 8,427,091 B2

DRIVE WITH HEAT DISSIPATION AND ENERGY-SAVING FUNCTION

BACKGROUND OF THE INVENTION

1. Field of the Invention

The present invention relates generally to a motor drive, and more particularly to a drive with heat dissipation and energy-saving function.

2. Description of the Related Art

In general, in order to promote working efficiency or achieve some specific work objects, a motor needs to have different operation patterns in accordance with the requirements of users. Currently, a motor is generally used in cooperation with a motor drive. A user can adjust the set parameters of the motor drive according to different working requirements to control the operation mode of the motor, for example, to start or stop the motor. However, when the motor abruptly accelerates or decelerates or in the case that the motor drive is under a high-load condition, the temperature of the motor drive will rise. In this case, it is necessary to additionally mount a predetermined number of cooling fans for lowering the temperature so as to protect the motor drive.

When the motor drive gives a stop command to the motor, the motor will not immediately stop operating, but will gradually brake and decelerate. At this time, the coils of the motor will still continuously intersect the magnetic field to create induced electric potential and produce regenerative current passing through the circuit. In case that the regenerative current fed back to the motor drive exceeds a value bearable by the motor drive, the electronic components of the motor drive will be damaged.

Currently, for overcoming the above problem of the conventional technique, in design of electrical control, the speed and acceleration/deceleration specification required by a user are previously calculated in detail and then a regenerative resistor with proper ohm value is additionally connected with the rectification circuit in the motor drive. The regenerative current is conducted to the regenerative resistor and consumed so as to protect the motor drive. In other words, the regenerative resistor can consume the energy generated when the motor abruptly accelerates or decelerates so as to prevent the energy from being directly absorbed by the capacitors of the motor drive. This can minimize the possibility of failure of the motor drive.

The above conventional device is able to achieve heat dissipation effect and effectively consume the regenerative current for protecting the motor drive. However, the conventional device still has the following shortcomings as follows:

1. It is necessary to additionally provide multiple cooling fans for lowering the temperature of the motor drive. This leads to waste of energy.
2. In design of electric control box, it is necessary to additionally reserve a space for placing the regenerative resistor. As a result, the usable room is reduced.

SUMMARY OF THE INVENTION

It is therefore a primary object of the present invention to provide a drive with heat dissipation and energy-saving function. The drive is applied to a motor for providing power to drive the motor. With the drive, it is unnecessary to additionally provide any regenerative resistor. Therefore, the usable room of the electric control box is enlarged.

It is a further object of the present invention to provide the above drive with heat dissipation and energy-saving function, which is able to effectively promote heat dissipation efficiency.

It is still a further object of the present invention to provide the above drive with heat dissipation and energy-saving function, which utilizes the excessive energy to achieve the objects of energy saving and carbon reduction in accordance with the requirement of environmental protection.

To achieve the above and other objects, the drive with heat dissipation and energy-saving function of the present invention is used to supply power to drive a motor. The drive includes a driving circuit having a rectification section. The rectification section serves to receive AC current generated when the motor abruptly accelerates/decelerates and convert the AC current into DC current and output the DC current. The drive further includes a cooling module electrically connected to an output end of the rectification section. The cooling module is drivable by the DC current output from the rectification section to conduct out and dissipate heat.

The present invention can be best understood through the following description and accompanying drawings, wherein:

DETAILED DESCRIPTION OF THE PREFERRED EMBODIMENTS

Figure 1:
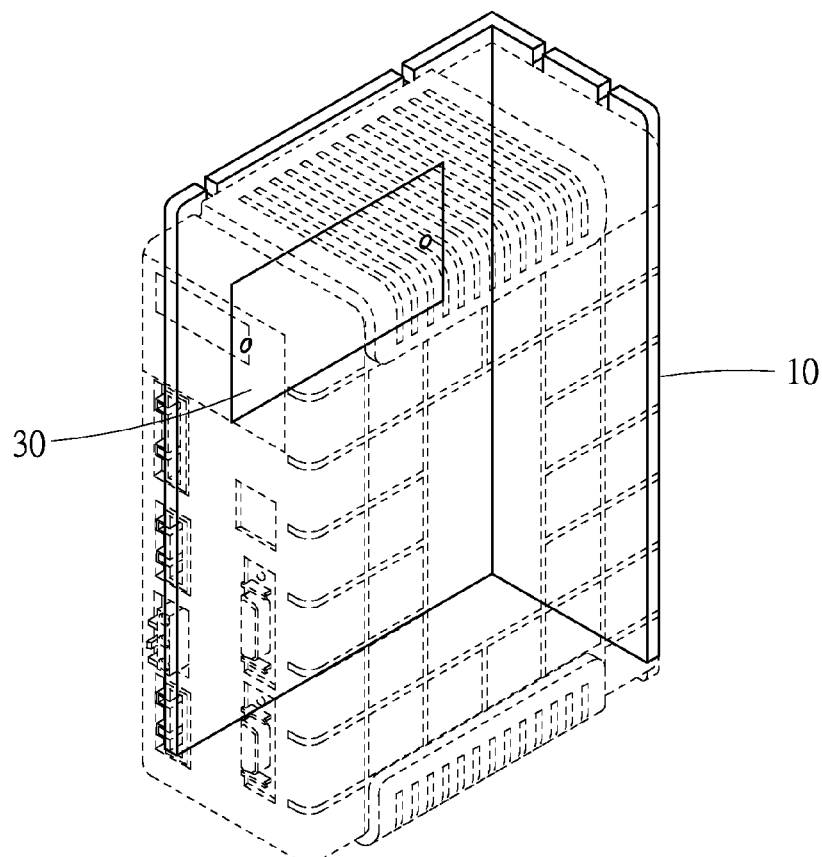
FIG. 1 is a perspective assembled view of a preferred embodiment of the present invention.
Figure 3:
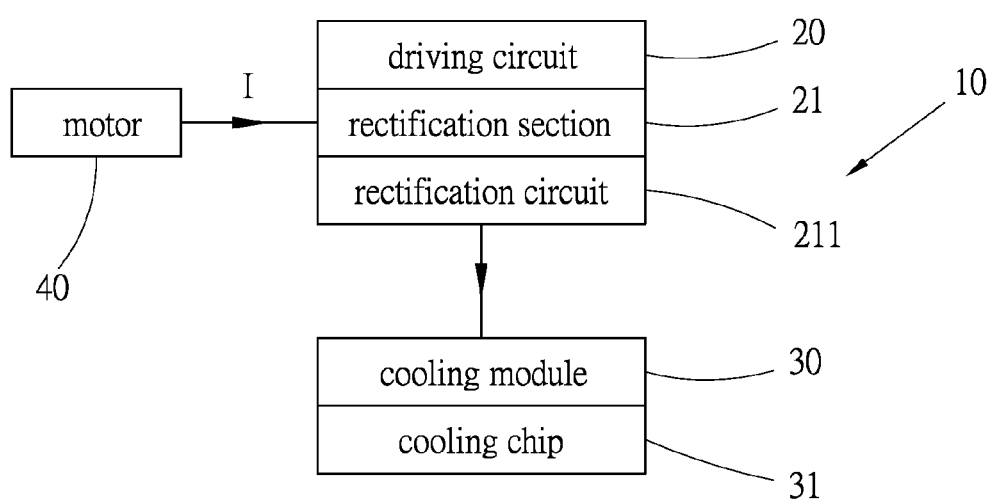
FIG. 3 is a block diagram of the preferred embodiment of the present invention in a motor deceleration state.
Figure 2:
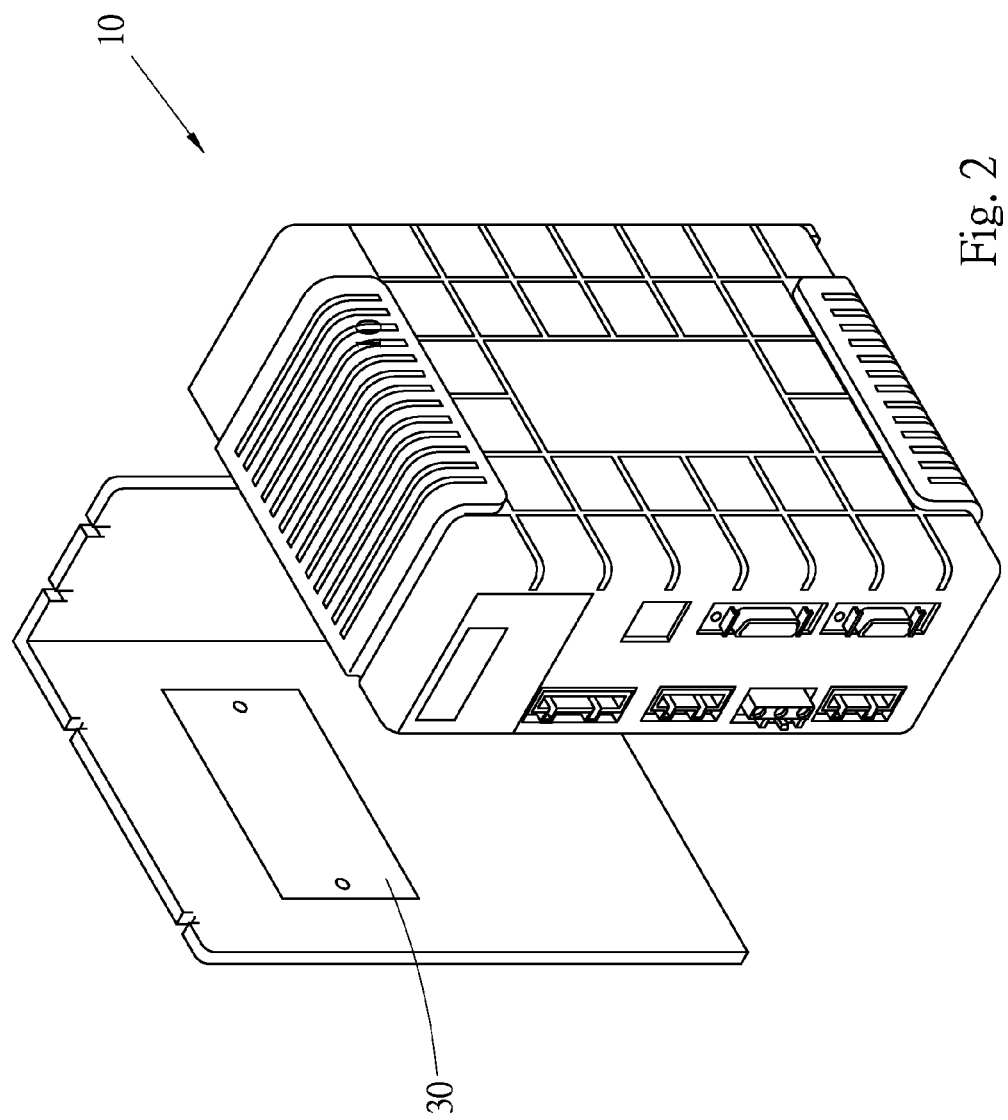
FIG. 2 is a perspective exploded view of the preferred embodiment of the present invention.

Please refer to FIGS. 1 to 3. According to a preferred embodiment, the drive 10 with heat dissipation and energy-saving function of the present invention is applied to a motor 40 for providing power to drive the motor 40. The motor 40 includes several coils (not shown) and magnets (not shown) and pertains to prior art. Therefore, the motor will not be further described hereinafter.

The drive 10 with heat dissipation and energy-saving function includes a driving circuit 20 and a cooling module 30.

The driving circuit 20 has a rectification section 21 formed of a rectification circuit 211 and connected to the motor 40. An input end of the rectification section 21 serves to receive electric energy I generated when the motor 40 abruptly accelerates/decelerates. The rectification section 21 then converts the electric energy I from AC power into DC power and outputs the DC power.

The cooling module 30 has a cooling chip 31 electrically connected to an output end of the rectification section 21. Accordingly, the cooling module 30 is drivable by the DC power output from the rectification section 21 to conduct out heat from the drive 10 and control the temperature of the drive 10.

Please further refer to FIG. 3. According to the above arrangement, when the motor 40 brakes and decelerates, the motor 40 will still continuously operate. That is, when braking and decelerating, the motor 40 will still generate electric energy I that is input to the rectification section 21. The rectification section 21 converts the electric energy I from AC power into DC power and outputs the DC power to drive the cooling module 30. In this case, the cooling module 30 is driven to enhance heat dissipation efficiency for the drive 10 and keep the temperature of the drive 10 under a safety value so as to protect the drive 10. The energy for driving the cooling module 30 comes from the electric energy I generated when the motor decelerates. Therefore, it is unnecessary to additionally provide any electric energy for the cooling module 30.

The drive 10 with heat dissipation and energy-saving function of the present invention utilizes the electric energy I generated when the motor decelerates to drive the cooling module 40 for lowering the drive's own temperature when the motor abruptly accelerates/decelerates or in the case that the motor drive is under a high-load condition. Therefore, the present invention has the following advantages:

1. In comparison with the conventional technique, it is unnecessary to additionally provide the regenerative resistor. Therefore, the usable room of the electric control box is enlarged to promote heat dissipation efficiency thereof.
2. The cooling module is able to effectively control the temperature of the drive and achieve better heat dissipation efficiency for the drive.
3. In comparison with the conventional technique, the present invention directly adopts the cooling module to dissipate the heat. Therefore, the number of the externally connected cooling fans can be reduced to save energy and lower cost.
4. The present invention utilizes the electric energy generated when the motor brakes and decelerates to drive the cooling module. Therefore, the excessive energy is well utilized without wasting.

In the above embodiment, the cooling module 30 is arranged on a heat dissipation section of the drive. Alternatively, the cooling module 30 can be disposed on a housing of the coils of the motor to lower the temperature of the coils and prolong the lifetime of the motor.

The above embodiments are only used to illustrate the present invention, not intended to limit the scope thereof. Many modifications of the above embodiments can be made without departing from the spirit of the present invention.

What is claimed is:

1. A drive with heat dissipation and energy-saving function for providing power to drive a motor, the drive comprising:
   a driving circuit having a rectification section for receiving AC power generated when the motor abruptly accelerates/decelerates and converting the AC power into DC power and outputting the DC power; and
   a cooling module electrically connected to an output end of the rectification section, whereby the cooling module is drivable by the DC power output from the rectification section to conduct out heat.

2. The drive with heat dissipation and energy-saving function as claimed in claim 1, wherein the cooling module serves to absorb heat generated when the motor operates.

3. The drive with heat dissipation and energy-saving function as claimed in claim 1, wherein the cooling module serves to absorb heat generated when the drive operates.

4. The drive with heat dissipation and energy-saving function as claimed in claim 1, wherein cooling module includes a cooling chip.

5. The drive with heat dissipation and energy-saving function as claimed in claim 1, wherein the rectification section includes a rectification circuit.

* * * * *